US011093292B2

(12) United States Patent
Rajendran et al.

(10) Patent No.: US 11,093,292 B2
(45) Date of Patent: Aug. 17, 2021

(54) IDENTIFYING RECURRING ACTIONS IN A HYBRID INTEGRATION PLATFORM TO CONTROL RESOURCE USAGE

(71) Applicant: INTERNATIONAL BUSINESS MACHINES CORPORATION, Armonk, NY (US)

(72) Inventors: Hemalatha Rajendran, Bangalore (IN); Balaji Sankar Kumar, Bangalore (IN); Kapish Malhotra, Kolkata (IN); Mohit Sati, Karanprayag (IN)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/585,098

(22) Filed: Sep. 27, 2019

(65) Prior Publication Data

US 2021/0096919 A1    Apr. 1, 2021

(51) Int. Cl.
*G06F 3/00*      (2006.01)
*G06F 9/50*      (2006.01)
*G06F 9/54*      (2006.01)
*G06F 16/22*     (2019.01)
*G06F 9/48*      (2006.01)

(52) U.S. Cl.
CPC .......... *G06F 9/5038* (2013.01); *G06F 9/4881* (2013.01); *G06F 9/542* (2013.01); *G06F 16/2255* (2019.01)

(58) Field of Classification Search
CPC .............................. G06F 16/2255; G06F 9/542
USPC ....................................................... 719/310
See application file for complete search history.

(56) References Cited

U.S. PATENT DOCUMENTS

| 2010/0088752 | A1* | 4/2010 | Nagulakonda ........ H04L 63/123 726/6 |
| 2011/0173626 | A1  | 7/2011 | Chi |
| 2014/0244598 | A1* | 8/2014 | Haustein ............... H04L 63/123 707/692 |

(Continued)

FOREIGN PATENT DOCUMENTS

| CN | 103095843 A | 5/2013 |
| CN | 106610792 A | 5/2017 |

(Continued)

OTHER PUBLICATIONS

Akhil Raj, Effective Threshold Defence against DOS Attack on SDN Controller. (Year: 2018).*

*Primary Examiner* — Lechi Truong
(74) *Attorney, Agent, or Firm* — Schmeiser, Olsen & Watts; Christopher M. Pignato

(57) ABSTRACT

An approach is provided for controlling computer resource usage. A new event in an integration flow in an integration platform is detected. Sender and receiver information is identified and hashed. A portion of data being sent by the sender to the receiver is selected and hashed. It is determined that the hashed sender and receiver information matches a first entry and the hashed selected portion of the data matches a second entry in a pattern repository. A recurring event in the integration flow is identified, where the recurring event uses an amount of computer resources that exceeds a threshold amount. An action is performed which reduces the amount of computer resources used by the integration flow to a new amount that does not exceed the threshold amount.

17 Claims, 8 Drawing Sheets

(56) References Cited

U.S. PATENT DOCUMENTS

2019/0179806 A1* 6/2019 Reinsberg ............. H04L 9/3255

FOREIGN PATENT DOCUMENTS

| WO | 20130788951 W | 6/2013 |
| WO | 20161966831 W | 12/2016 |

* cited by examiner

US 11,093,292 B2

IDENTIFYING RECURRING ACTIONS IN A HYBRID INTEGRATION PLATFORM TO CONTROL RESOURCE USAGE

BACKGROUND

The present invention relates to computer resource management, and more particularly to controlling usage of computer resources in an integration flow in a hybrid cloud integration platform.

In a hybrid cloud integration platform, there is a need to develop highly efficient integration solutions that cater to the needs of the end user. Hybrid cloud integration solutions include application integration solutions, which involve integrating two applications to enable an automation of business processes that that are mainly targeted for marketing professionals and non-technical users, enabling them to accelerate the business. For example, the two applications being integrated by the application integration solutions may be targeted to marketing professionals and non-technical users, enabling them to accelerate their business.

Application integration solutions include a source application and a target application to create an integration flow. Source applications are inbound connectors (i.e., triggers), which listen to events in an enterprise application. Target applications are outbound connectors (i.e., action), which perform an action on the endpoint in response to a trigger. An exemplary integration flow in a given application integration solution is configured in such a way that in response to an account being created in an enterprise application, an email is sent to a configured email account. One example of an application integration solution is IBM® App Connect. IBM is a registered trademark of International Business Machines Corporation located in Armonk, N.Y.

SUMMARY

In one embodiment, the present invention provides a computer-implemented method. The method includes detecting, by one or more processors, a new event specified in an integration platform. The method further includes in response to the detecting the new event, identifying, by the one or more processors, information about a sender and a receiver associated with the new event. The method further includes hashing, by the one or more processors, the information about the sender and the receiver. The method further includes selecting, by the one or more processors, a portion of data being sent by the sender to the receiver as a result of the new event. The method further includes hashing, by the one or more processors, the selected portion of the data. The method further includes determining, by the one or more processors, that the hashed information about the sender and the receiver matches a first entry in a data repository of patterns. The method further includes determining, by the one or more processors, that the hashed selected portion of the data matches a second entry in the data repository of patterns. The method further includes based on the hashed information about the sender and the receiver matching the first entry and the hashed selected portion of the data matching the second entry, identifying, by the one or more processors, a recurring event in the integration flow that uses an amount of computer resources in the integration platform that exceeds a threshold amount. The method further includes in response to the identifying the recurring event in the integration flow, performing, by the one or more processors, an action which reduces the amount of computer resources used by the integration flow to a new amount that does not exceed the threshold amount.

A computer program product and a computer system corresponding to the above-summarized method are also described and claimed herein.

DETAILED DESCRIPTION

Overview

Figure 1:
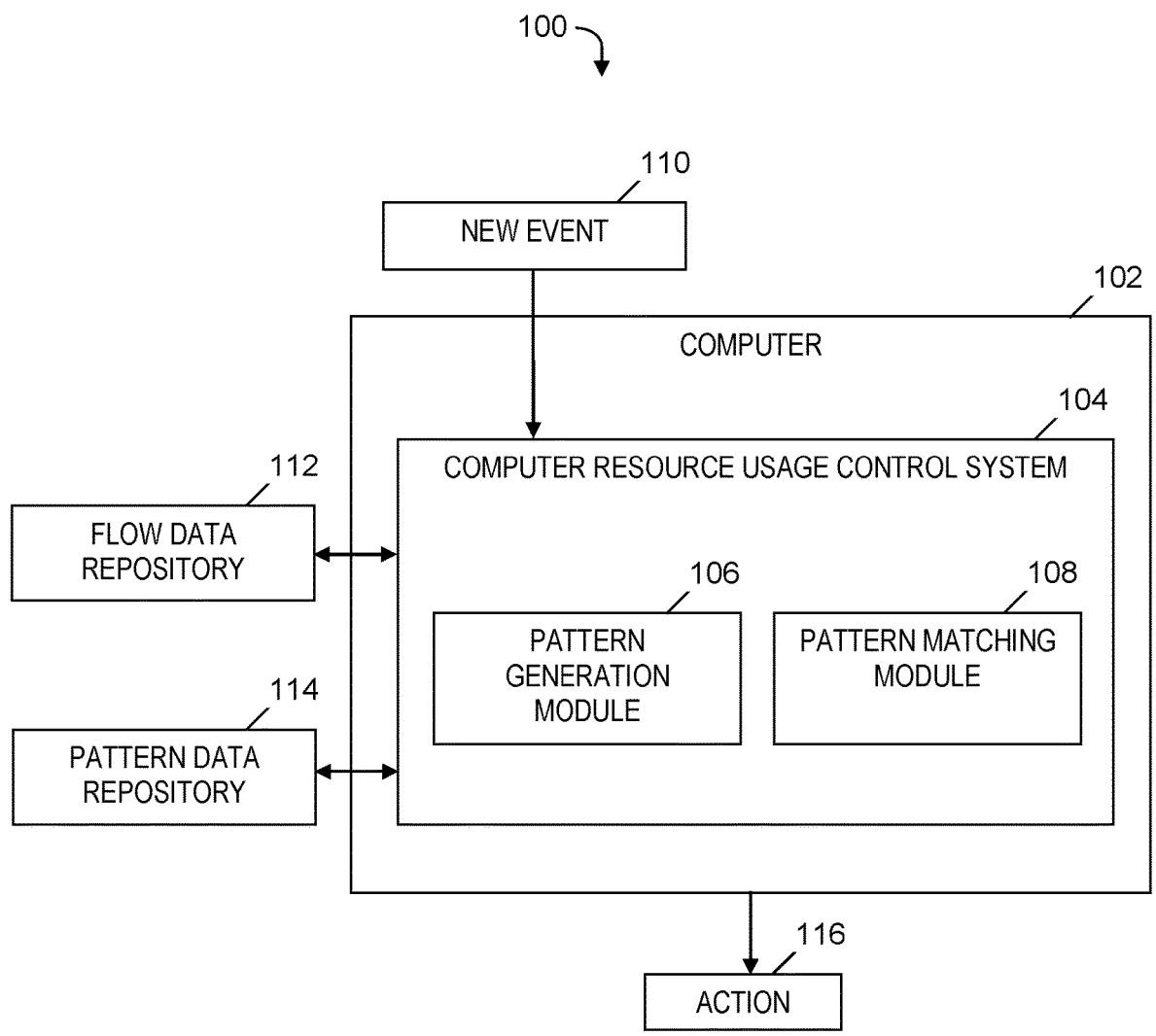
FIG. 1 is a block diagram of a system for controlling computer resource usage, in accordance with embodiments of the present invention.

To ensure that business processes are run in an efficient and effective manner in a hybrid cloud integration platform that supports multi-tenancy, it is important to identify problems that can lead to computer resource hogging and take appropriate action in response to identifying such problems. In the application integration space, an integration flow may be configured by the end user that results in a recurring event (also known as a recurring action). For example, an end user creates an integration flow for the purpose of data copy from one database to another database which can excessively use computer resources and place other flows in a low priority. In a multi-tenancy environment, an integration flow resulting in a recurring event can result in computer resource usage which is excessive (e.g., hog memory), thereby affecting the processing and resource availability for other tenants. An integration flow resulting in an infinite loop can also cause duplication within the target application of the current user itself.

The end user may also create an integration flow that results in an infinite loop. For example, the following integration flow is in an integration platform:

New social networking service XYZ message→Create group communication platform UVW message→Create social networking service XYZ message The integration flow presented above is configured in a way that leads to an infinite loop. Suppose a first message arrives on social networking service XYZ. The arrival of the first message triggers a message via group communication platform UVW. The group communication platform UVW message triggers a second message on social networking service XYZ, which triggers another group communication platform UVW message, causing the system to go into an infinite loop as long as both the endpoint accounts used in the social networking service XYZ trigger node and the social networking service action node are the same.

An infinite loop can also be caused by two integration flows making a loop, as indicated by the following example:

Flow 1: New social networking service XYZ message→New group communication platform UVW message Flow 2: New group communication platform UVW message→New social networking service XYZ message An infinite loop can also be caused by two integration flows in different integration platforms making a loop, as indicated in the following example:

Flow 1 in Platform AB: New social networking service XYZ message→New group communication platform UVW message Flow 2 in Platform CD: New group communication platform UVW message→New social networking service XYZ message An integration flow that results in an infinite loop or another recurring action can easily occur in a system, cause computer resource usage to be excessive, and place other jobs in low priority. An infinite loop or other recurring action caused by an integration flow can also result in a corruption of a database or a creation of multiple records with the same information in a short amount of time in an application. The aforementioned infinite loops can also cause a violation of an application programming interface (API) rate limit of the user's endpoint account, thereby causing the user's account to be locked, disabled, or billed at an increased amount. Known techniques that manage integration flows do not have an easy way to (i) identify the aforementioned infinite loops and recurring events and (ii) take preventative action before the computer resource usage becomes excessive.

Embodiments of the present invention address the aforementioned unique challenges of addressing integration flows that cause excessive computer resource usage in a multi-tenant hybrid cloud integration platform. In one embodiment, a computer resource usage control system utilizes partial hashing of the content and sender and receiver information of a trigger in an integration flow and passes the hashed items through a pattern matcher and pattern recognizer which determines whether the integration flow (i) includes a recurring event or an infinite loop (i.e., the integration flow is a loopy flow) or (ii) indicates an actual business use case. In one embodiment, in response to determining that the integration flow includes an infinite loop, the computer resource usage control system performs one or more actions to avoid excessive computer resource usage, such as halting the loopy flow or decreasing the priority of the loopy flow, thereby allowing other integration flows to run with priorities that are greater than the decreased priority of the loopy flow.

System for Controlling Computer Resource Usage

FIG. 1 is a block diagram of a system 100 for controlling computer resource usage, in accordance with embodiments of the present invention. System 100 includes a computer 102, which executes a software-based computer resource usage control 104, which includes a pattern generation module 106 and a pattern matching module 108.

Computer resource usage control system 104 listens for a new event 110 (i.e., a trigger) in an integration flow in a multi-tenant hybrid cloud integration platform. Computer resource usage control system 104 retrieves and reads flow information from a flow data repository 112 to identify sender and receiver information of new event 110. In one embodiment, flow data repository 112 includes an external database system or cache that stores information pertaining to integration flows, including integration flow identifiers and Trigger and Action related information that is utilized by the run-time services during integration flow execution.

Pattern generation module 106 generates a pattern for the sender and receiver information and incoming data in new event 110 and stores the pattern in a pattern data repository 114. In one embodiment, pattern data repository 114 includes an external database or cache that stores the hashed data sets for the data content transmitted during an integration flow execution. Each entry in pattern data repository 114 corresponds to a specific integration flow whose information is stored in flow data repository 112. In one embodiment, the entries in pattern data repository 114 are linked to respective entries in flow data repository 112 by integration flow identifiers.

Pattern matching module 108 reads other patterns in pattern data repository 114 to determine whether there is a previously stored match to the pattern that was generated and stored for new event 110. In response to pattern matching module 108 finding a pattern in pattern data repository 114 that matches the pattern generated for new event 110, computer resource usage control system 104 selects and performs an action 116 to prevent the integration flow that includes new event 110 from excessively using computer resources.

In one embodiment, computer resource usage control system 104 uses a two-level pattern validation technique to distinguish actual business transactions from spamming transactions. In one embodiment, computer resource usage control system 104 uses the two-level pattern validation technique to determine whether copying of data includes (i) copying different sets of data or records, which indicates an actual business transaction, or (ii) copying the same set of content repeatedly, which indicates a spamming transaction. In one embodiment, the first level of the two-level pattern validation technique identifies whether a transaction happens between the same account and the second level identifies whether the same data has been repeatedly posted.

The functionality of the components shown in FIG. 1 is described in more detail in the discussion of FIGS. 2A-2B, FIGS. 3A-3C, and FIG. 4 presented below.

Process for Controlling Computer Resource Usage

Figure 2A:
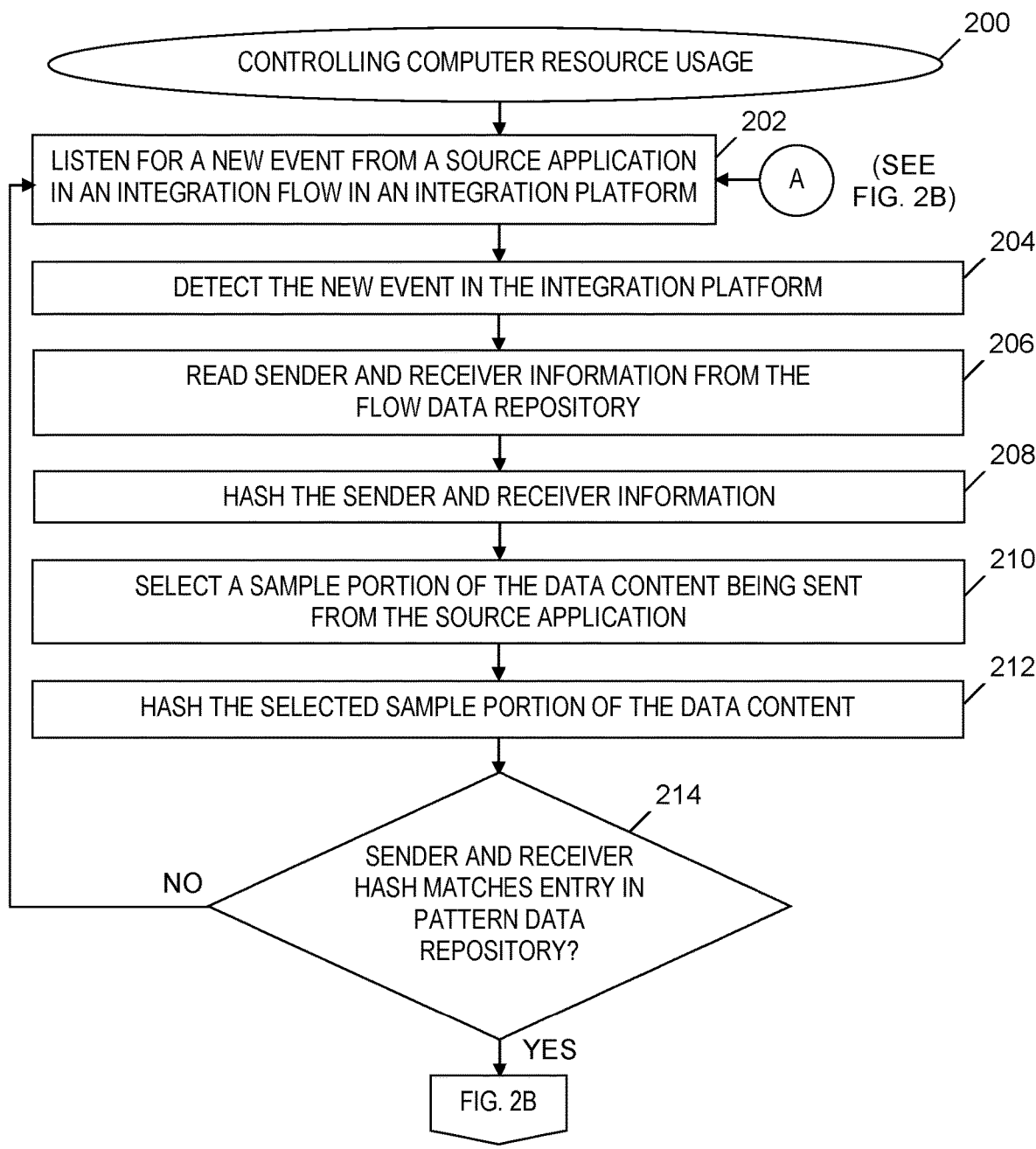
FIGS. 2A-2B depict a flowchart of a process of controlling computer resource usage, where the process is implemented in the system of FIG. 1, in accordance with embodiments of the present invention.
Figure 2B:
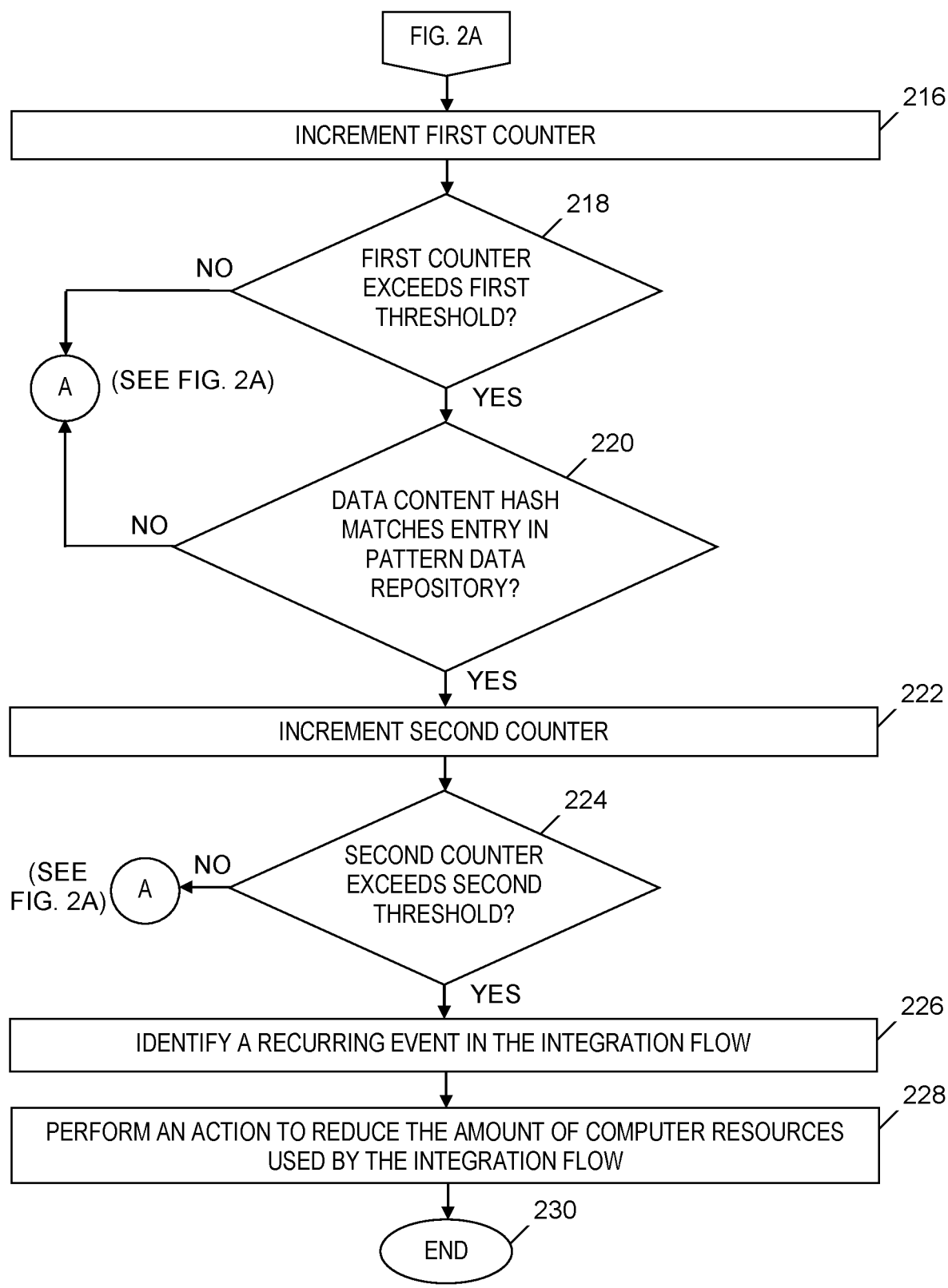

FIGS. 2A-2B depict a flowchart of a process of controlling computer resource usage, where the process is implemented in the system of FIG. 1, in accordance with embodiments of the present invention. The process of FIGS. 2A-2B starts at step 200 in FIG. 2A. In step 202, computer resource usage control system 104 (see FIG. 1) listens for new event 110 (see FIG. 1), which is a trigger in an integration flow in an integration platform. In one embodiment, the integration platform is a multi-tenant hybrid cloud integration platform.

In step 204, computer resource usage control system 104 (see FIG. 1) detects new event 110 (see FIG. 1) (i.e., detects a trigger in an integration flow in the integration platform).

In one embodiment, prior to step 206, computer resource usage control system 104 (see FIG. 1) retrieves from flow data repository 112 (see FIG. 1) a configuration of an integration flow that specifies new event 110 (see FIG. 1) as a trigger in the integration flow.

In step 206, computer resource usage control system 104 (see FIG. 1) reads integration flow metadata from flow data repository 112 (see FIG. 1), including information specifying a sender and a receiver associated with the integration flow. Hereinafter, the information specifying the sender and the receiver associated with the integration flow is also referred to simply as the sender and receiver information. In one embodiment, the reading of the information specifying the sender and receiver in step 206 is based on the configuration of the integration flow retrieved from flow data repository 112 (see FIG. 1).

In step 208, pattern generation module 106 (see FIG. 1) hashes (i.e., generates a pattern for) the sender and receiver information, which was read in step 206. In one embodiment, the generation of the pattern in step 208 uses partial hashing and the MD5 algorithm.

In step 210, computer resource usage control system 104 (see FIG. 1) selects a sample portion of data content being sent by a source application in the integration flow as a result of new event 110 (see FIG. 1).

In step 212, pattern generation module 106 (see FIG. 1) hashes (i.e., generates a pattern for) the sample portion of the data content selected in step 210. In one embodiment, the generation of the pattern in step 212 uses partial hashing and the MD5 algorithm. In one or more embodiments, the selected portion of the data content is selected by choosing (i) the first n characters in text content of the trigger, where n is a configurable positive integer, (ii) a random character offset in the text content of the trigger, or (iii) values in mandatory fields in the case of data content in the form a key value pair.

Alternatively, in step 210, computer resource usage control system 104 (see FIG. 1) selects the entire incoming data being sent by the source application, and in step 212, pattern generation module 106 (see FIG. 1) hashes the entire incoming data.

In a step (not shown) subsequent to step 212, computer resource usage control system 104 (see FIG. 1) saves the hashed sender and receiver information and the hashed selected sample portion of the data content in pattern data repository 114 (see FIG. 1).

In step 214, a first level of a two-level pattern matching validation begins with pattern matching module 108 (see FIG. 1) determining whether the hashed sender and receiver information matches a sender and receiver information entry in a hash list in pattern data repository 114 (see FIG. 1). If the hashed sender and receiver information does not match a sender and receiver information entry in pattern data repository 114 (see FIG. 1), then the No branch of step 214 is taken and the process of FIGS. 2A-2B loops back to step 202. If the hashed sender and receiver information matches a sender and receiver information entry in pattern data repository 114 (see FIG. 1), then the Yes branch of step 214 is taken and the process of FIGS. 2A-2B continues with step 216 in FIG. 2B.

In step 216 in FIG. 2B, pattern matching module 108 (see FIG. 1) increments a first counter.

In step 218, pattern matching module 108 (see FIG. 1) determines whether the first counter exceeds a predetermined first threshold. If pattern matching module 108 (see FIG. 1) determines in step 218 that the first counter does not exceed the first threshold, then the No branch of step 218 is taken and the process of FIGS. 2A-2B loops back to step 202 in FIG. 2A. If pattern matching module 108 (see FIG. 1) determines in step 218 that the first counter exceeds the first threshold, then the Yes branch of step 218 is taken and step 220 is performed to begin the second level of the two-level pattern matching validation. In one embodiment, in response to taking the Yes branch of step 218, computer resource usage control system 104 begins to monitor the integration flow in a second level of the two-level pattern matching validation, beginning at step 220.

In step 220, pattern matching module 108 (see FIG. 1) determines whether the hashed portion of the data content matches a data content entry in pattern data repository 114 (see FIG. 1). If pattern matching module 108 (see FIG. 1) determines in step 220 that the hashed portion of the data content does not match a data content entry in pattern data repository 114 (see FIG. 1), then the No branch of step 220 is taken and the process of FIGS. 2A-2B loops back to step 202 in FIG. 2A. If pattern matching module 108 (see FIG. 1) determines in step 220 that the hashed portion of the data content matches a data content entry in pattern data repository 114 (see FIG. 1), then the Yes branch of step 220 is taken and step 222 is performed.

In step 222, pattern matching module 108 (see FIG. 1) increments a second counter.

In step 224, pattern matching module 108 (see FIG. 1) determines whether the second counter exceeds a predetermined second threshold. If pattern matching module 108 (see FIG. 1) determines in step 224 that the second counter does not exceed the second threshold, then the No branch of step 224 is taken and the process of FIGS. 2A-2B loops back to step 202 in FIG. 2A. If pattern matching module 108 (see FIG. 1) determines in step 224 that the second counter exceeds the second threshold, then the Yes branch of step 224 is taken and step 226 is performed.

In step 226, based on the first counter exceeding the first threshold and the second counter exceeding the second threshold, computer resource usage control system 104 (see FIG. 1) identifies an infinite loop or other recurring event in the integration flow.

In step 228, responsive to step 226, computer resource usage control system 104 (see FIG. 1) selects and performs action 116 (see FIG. 1) to reduce the amount of computer resources used by the integration flow so that the usage of computer resources by the integration flow is reduced from being an excessive usage (i.e., an amount of usage of computer resources that exceeds a threshold amount of usage) to a usage that is not excessive (e.g., a new amount of usage of computer resources that does not exceed the threshold amount of usage). For example, action 116 (see FIG. 1) includes setting subsequent transactions in the integration flow to a lower priority, halting the integration flow, and/or sending a notification of the recurring event to a user.

In one embodiment, step 228 includes computer resource usage control system 104 (see FIG. 1) decreasing the priority of subsequent transactions in the integration flow. In one embodiment, after taking the Yes branch of step 218, computer resource usage control system 104 (see FIG. 1) decreases the priority of subsequent transactions in the integration flow to a first priority and step 228 includes computer resource usage control system 104 (see FIG. 1) decreasing the first priority to a second priority for subsequent transactions in the integration flow, where the second priority is less than the first priority.

The process of FIGS. 2A-2B ends at step 230.

The process of FIGS. 2A-2B can distinguish between business use cases and spamming or other non-business use cases. For example, computer resource usage control system 104 (see FIG. 1) detects a business use case of copying data from one application to another application in a flow, by determining that there is a different set of data for every transaction in the flow (i.e., the second counter does not exceed the second threshold in step 224 and therefore an action in step 228 is not performed), even though the transactions have the same sender and receiver information (i.e., the Yes branch of step 214 is taken multiple times). As another example, computer resource usage control system 104 (see FIG. 1) detects a flow that is designed to go in a loop with the same data (i.e., the Yes branch of step 220 is taken repeatedly and the second counter exceeds the second threshold in step 224), which indicates spamming or another non-business use case.

Example

Figure 3A:
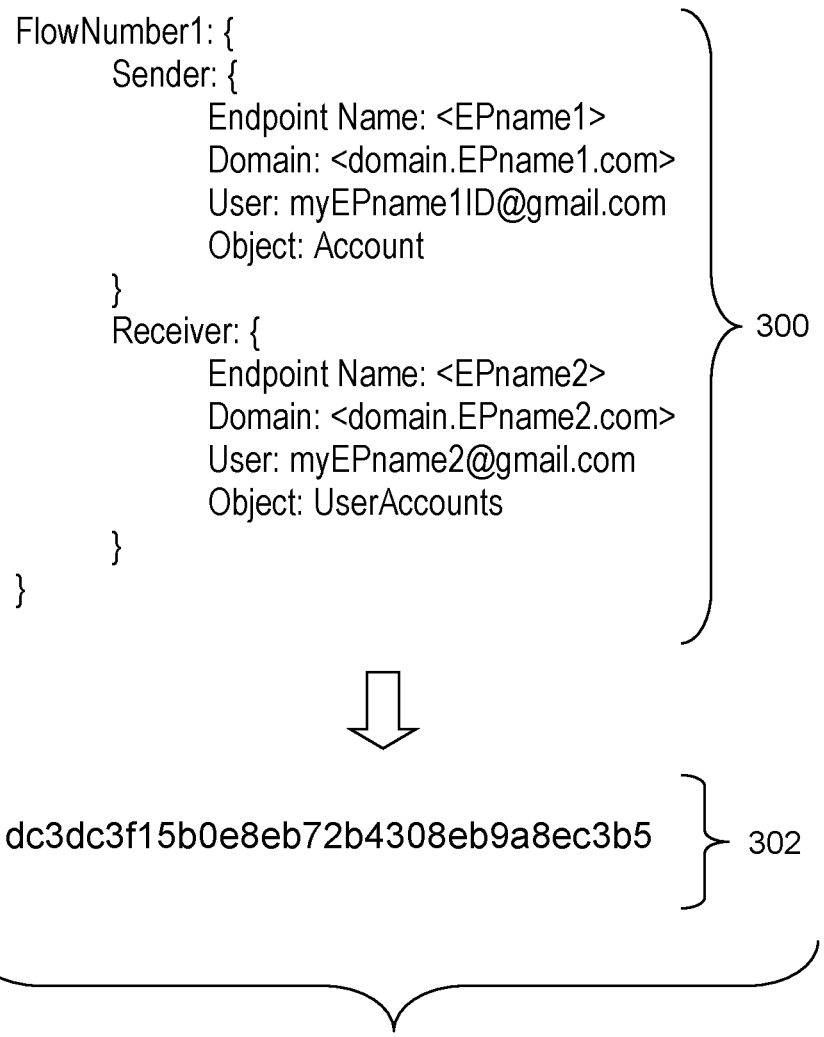
FIGS. 3A-3C depict an example of pattern generation included in the process of FIGS. 2A-2B, in accordance with embodiments of the present invention.
Figures 3B, 3C:
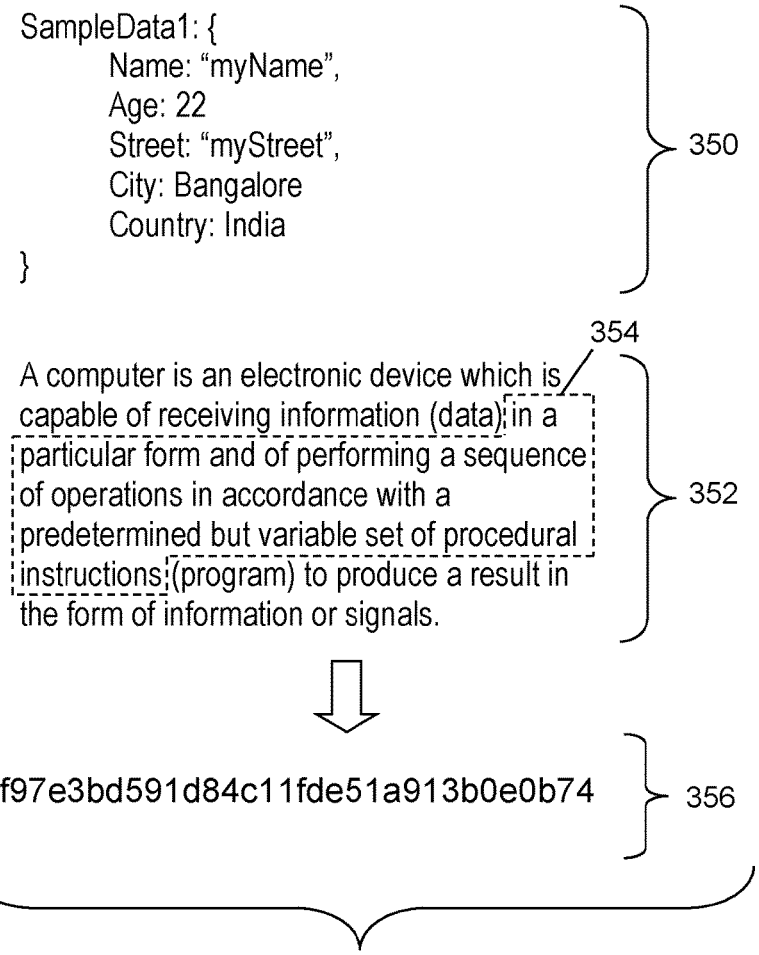

FIGS. 3A-3C depict an example of pattern generation included in the process of FIGS. 2A-2B, in accordance with embodiments of the present invention. In FIG. 3A, computer resource usage control system 104 (see FIG. 1) reads sender and receiver information 300 for an integration flow from flow data repository 112 (see FIG. 1) in step 206 (see FIG. 2A).

Using the MD5 algorithm, computer resource usage control system 104 (see FIG. 1) hashes sender and receiver information 300 in step 208 (see FIG. 2A) to generate a sender and receiver hash 302.

In FIG. 3B, incoming data for the integration flow includes a sample content 350 and a text content 352. In step 210 (see FIG. 2A), computer resource usage control system 104 (see FIG. 1) selects a portion 354 of text content 352. In step 212 (see FIG. 2A), computer resource usage control system 104 (see FIG. 1) uses the MD5 algorithm to hash portion 354 to generate a data hash 356.

In FIG. 3C, computer resource usage control system 104 (see FIG. 1) saves sender and receiver hash 302 (see FIG. 3A) and data hash 356 in a pattern database 370, which is included in pattern data repository 114 (see FIG. 1).

Computer System

Figure 4:
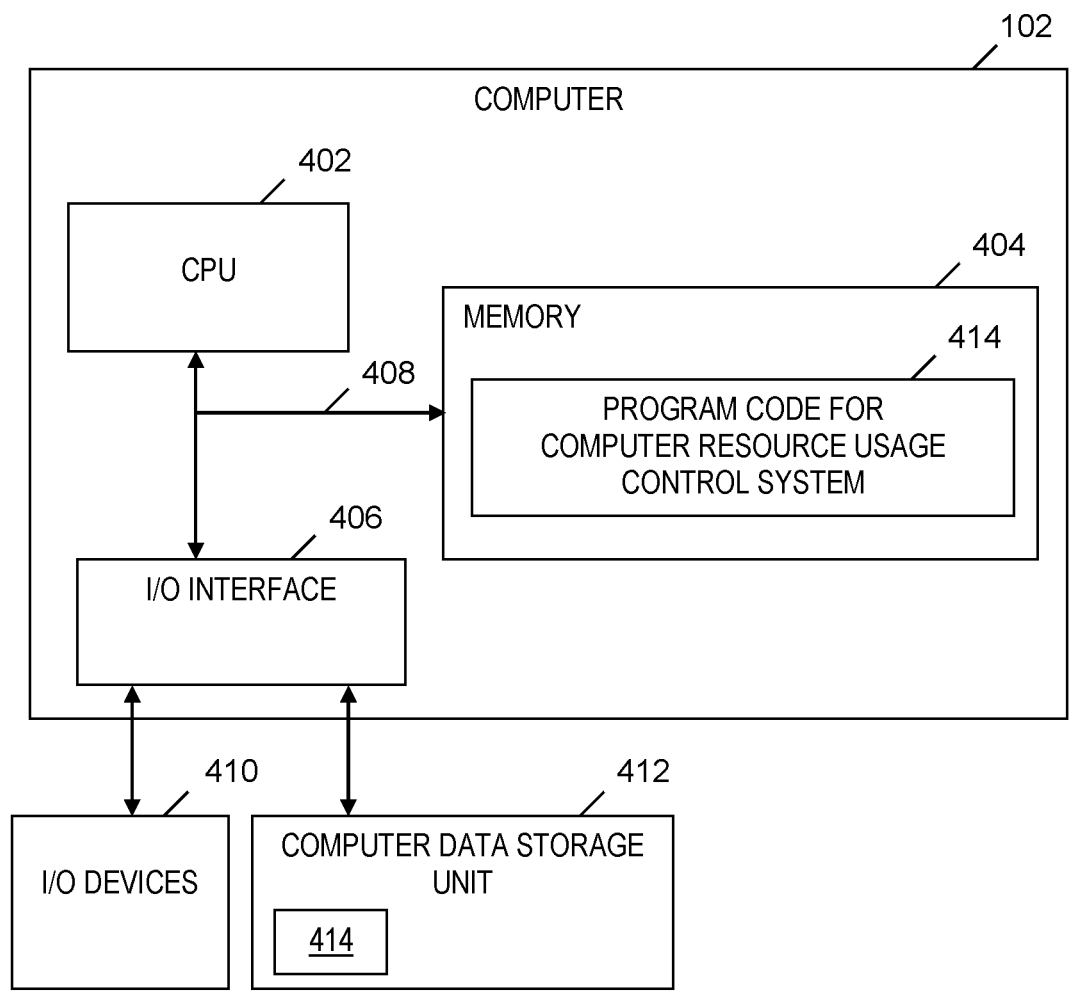
FIG. 4 is a block diagram of a computer that is included in the system of FIG. 1 and that implements the process of FIGS. 2A-2B, in accordance with embodiments of the present invention.

FIG. 4 is a block diagram of a computer that is included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for a system that includes computer resource usage control system 104 (see FIG. 1) to perform a method of controlling computer resource usage, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to control computer resource usage. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes flow data repository 112 (see FIG. 1) and pattern data repository 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to controlling computer resource usage. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to control computer resource usage. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of controlling computer resource usage.

While it is understood that program code 414 for controlling computer resource usage may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of controlling computer resource usage. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
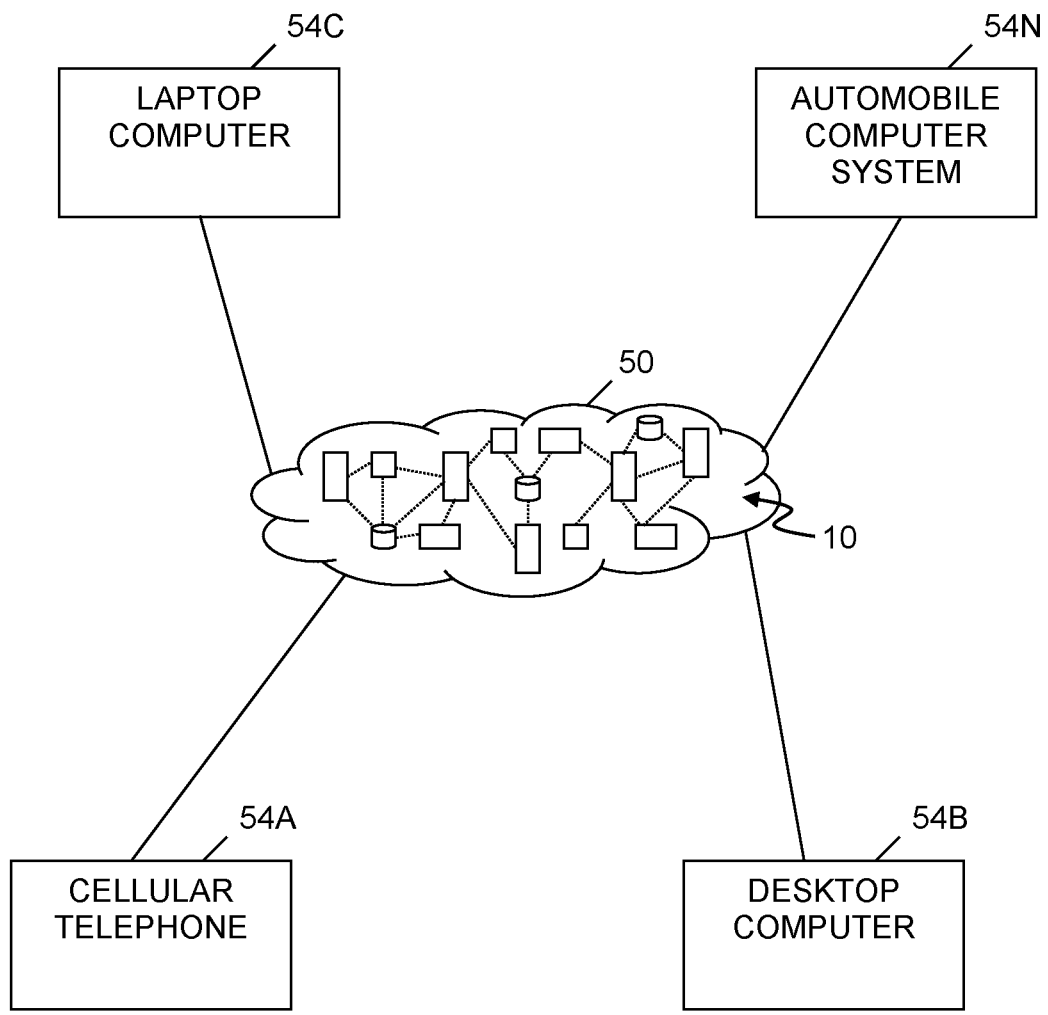
FIG. 5 depicts a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
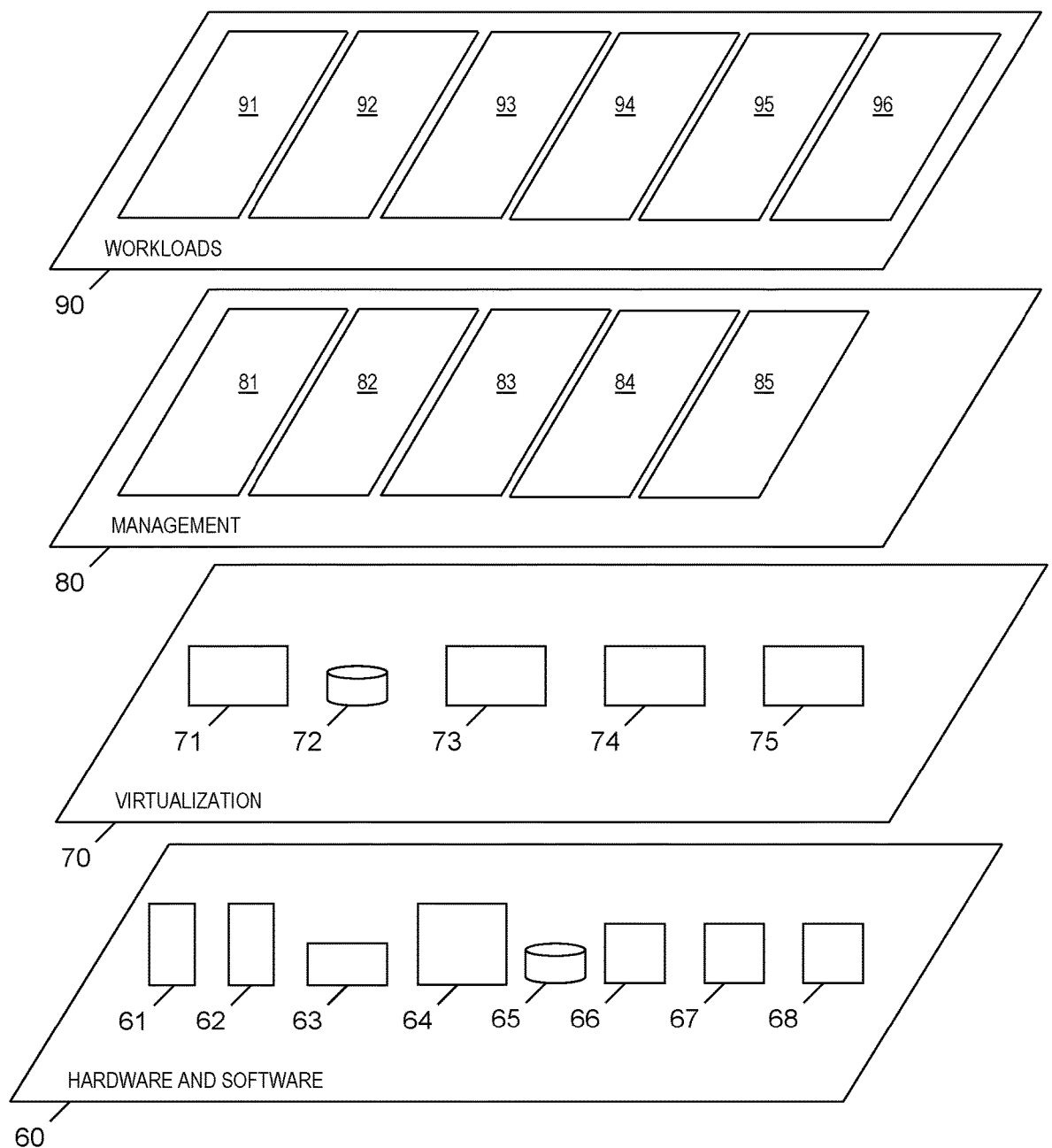
FIG. 6 depicts abstraction model layers that are provided by the cloud computing environment of FIG. 5 and that provide the functionality of the system of FIG. 1, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer resource usage control 96.

What is claimed is:

1. A computer-implemented method comprising:
   detecting, by one or more processors, a new event specified in an integration platform;
   in response to the detecting the new event, identifying, by the one or more processors, information about a sender and a receiver associated with the new event;
   hashing, by the one or more processors, the information about the sender and the receiver;
   selecting, by the one or more processors, a portion of data being sent by the sender to the receiver as a result of the new event;
   hashing, by the one or more processors, the selected portion of the data;
   determining, by the one or more processors, that the hashed information about the sender and the receiver matches a first entry in a data repository of patterns;
   determining, by the one or more processors, that the hashed selected portion of the data matches a second entry in the data repository of patterns;
   based on the hashed information about the sender and the receiver matching the first entry and the hashed selected portion of the data matching the second entry, identifying, by the one or more processors, a recurring event in the integration flow that uses an amount of computer resources in the integration platform that exceeds a threshold amount;
   in response to the identifying the recurring event in the integration flow, performing, by the one or more processors, an action which reduces the amount of computer resources used by the integration flow to a new amount that does not exceed the threshold amount;
   based on the hashed information about the sender and the receiver matching the first entry, incrementing, by the one or more processors, a first counter;
   determining, by the one or more processors, that the incremented first counter exceeds a first threshold; and
   based on the incremented first counter exceeding the first threshold, decreasing, by the one or more processors, a priority of transactions in the integration flow to a first priority.

2. The method of claim 1, further comprising:
   based on the hashed information about the sender and the receiver matching the first entry and the hashed selected portion of the data matching the second entry, and using a pattern matcher, identifying, by the one or more processors, an infinite loop in the integration flow, wherein the identifying the recurring event includes the identifying the infinite loop in the integration flow.

3. The method of claim 1, wherein the performing the action includes decreasing a priority of the integration flow so that one or more other integration flows are executed at a priority that is greater than the decreased priority of the integration flow.

4. The method of claim 1, wherein the performing the action includes halting the integration flow so that the computer resources are used by one or more other integration flows.

5. The method of claim 1, further comprising:
   based on the hashed selected portion of the data matching the second entry, incrementing, by the one or more processors, a second counter;
   determining, by the one or more processors, that the incremented second counter exceeds a second threshold; and
   based on the incremented second counter exceeding the second threshold, decreasing, by the one or more processors, the priority of the transactions in the integration flow to a second priority which is less than the first priority.

6. The method of claim 1, further comprising in response to the identifying the recurring event in the integration flow, sending, by the one or more processors, a notification to a user about the identified recurring event.

7. The method of claim 1, further comprising the step of: providing at least one support service for at least one of creating, integrating, hosting, maintaining, and deploying computer readable program code in the computer, the program code being executed by a processor of the computer to implement detecting the new event, identifying the information about the sender and the receiver, hashing the information about the sender and the receiver, selecting the portion of the data, hashing the selected portion of the data, determining that the hashed information about the sender and the receiver matches the first entry, determining that the hashed selected portion of the data matches the second entry, identifying the recurring event, performing the action which reduces the amount of computer resources used by the integration flow, incrementing the first counter, determining that the incremented first counter exceeds the first threshold, and decreasing the priority of the transactions in the integration flow to the first priority.

8. A computer program product comprising:
a computer readable storage medium having computer readable program code stored on the computer readable storage medium, the computer readable program code being executed by a central processing unit (CPU) of a computer system to cause the computer system to perform a method comprising the steps of:
the computer system detecting a new event specified in an integration platform;
in response to the detecting the new event, the computer system identifying information about a sender and a receiver associated with the new event;
the computer system hashing the information about the sender and the receiver;
the computer system selecting a portion of data being sent by the sender to the receiver as a result of the new event;
the computer system hashing the selected portion of the data;
the computer system determining that the hashed information about the sender and the receiver matches a first entry in a data repository of patterns;
the computer system determining that the hashed selected portion of the data matches a second entry in the data repository of patterns;
based on the hashed information about the sender and the receiver matching the first entry and the hashed selected portion of the data matching the second entry, the computer system identifying a recurring event in the integration flow that uses an amount of computer resources in the integration platform that exceeds a threshold amount;
in response to the identifying the recurring event in the integration flow, the computer system performing an action which reduces the amount of computer resources used by the integration flow to a new amount that does not exceed the threshold amount;
based on the hashed information about the sender and the receiver matching the first entry, the computer system incrementing a first counter;
the computer system determining that the incremented first counter exceeds a first threshold; and
based on the incremented first counter exceeding the first threshold, the computer system decreasing a priority of transactions in the integration flow to a first priority.

9. The computer program product of claim 8, wherein the method further comprises:
based on the hashed information about the sender and the receiver matching the first entry and the hashed selected portion of the data matching the second entry, and using a pattern matcher, the computer system identifying an infinite loop in the integration flow, wherein the identifying the recurring event includes the identifying the infinite loop in the integration flow.

10. The computer program product of claim 8, wherein the performing the action includes decreasing a priority of the integration flow so that one or more other integration flows are executed at a priority that is greater than the decreased priority of the integration flow.

11. The computer program product of claim 8, wherein the performing the action includes halting the integration flow so that the computer resources are used by one or more other integration flows.

12. The computer program product of claim 8, wherein the method further comprises:
based on the hashed selected portion of the data matching the second entry, the computer system incrementing a second counter;
the computer system determining that the incremented second counter exceeds a second threshold; and
based on the incremented second counter exceeding the second threshold, the computer system decreasing the priority of the transactions in the integration flow to a second priority which is less than the first priority.

13. A computer system comprising:
a central processing unit (CPU);
a memory coupled to the CPU; and
a computer readable storage medium coupled to the CPU, the computer readable storage medium containing instructions that are executed by the CPU via the memory to implement a method comprising the steps of:
the computer system detecting a new event specified in an integration platform;
in response to the detecting the new event, the computer system identifying information about a sender and a receiver associated with the new event;
the computer system hashing the information about the sender and the receiver;
the computer system selecting a portion of data being sent by the sender to the receiver as a result of the new event;
the computer system hashing the selected portion of the data;
the computer system determining that the hashed information about the sender and the receiver matches a first entry in a data repository of patterns;
the computer system determining that the hashed selected portion of the data matches a second entry in the data repository of patterns;
based on the hashed information about the sender and the receiver matching the first entry and the hashed selected portion of the data matching the second entry, the computer system identifying a recurring event in the integration flow that uses an amount of computer resources in the integration platform that exceeds a threshold amount;
in response to the identifying the recurring event in the integration flow, the computer system performing an action which reduces the amount of computer resources used by the integration flow to a new amount that does not exceed the threshold amount;

based on the hashed information about the sender and the receiver matching the first entry, the computer system incrementing a first counter;

the computer system determining that the incremented first counter exceeds a first threshold; and based on the incremented first counter exceeding the first threshold, the computer system decreasing a priority of transactions in the integration flow to a first priority.

14. The computer system of claim 13, wherein the method further comprises:

based on the hashed information about the sender and the receiver matching the first entry and the hashed selected portion of the data matching the second entry, and using a pattern matcher, the computer system identifying an infinite loop in the integration flow, wherein the identifying the recurring event includes the identifying the infinite loop in the integration flow.

15. The computer system of claim 13, wherein the performing the action includes decreasing a priority of the integration flow so that one or more other integration flows are executed at a priority that is greater than the decreased priority of the integration flow.

16. The computer system of claim 13, wherein the performing the action includes halting the integration flow so that the computer resources are used by one or more other integration flows.

17. The computer system of claim 13, wherein the method further comprises:

based on the hashed selected portion of the data matching the second entry, the computer system incrementing a second counter;

the computer system determining that the incremented second counter exceeds a second threshold; and based on the incremented second counter exceeding the second threshold, the computer system decreasing the priority of the transactions in the integration flow to a second priority which is less than the first priority.

* * * * *